United States Patent
Brennan et al.

(10) Patent No.: US 7,300,986 B2
(45) Date of Patent: Nov. 27, 2007

(54) POLYEPOXY COMPOUNDS HAVING AN AMIDE LINKAGE

(75) Inventors: David J. Brennan, Midland, MI (US); Jerry E. White, Lake Jackson, TX (US); Jimmy D. Earls, Lake Jackson, TX (US); Mary L. Dettloff, Lake Jackson, TX (US)

(73) Assignee: Dow3Global Technologies Inc., Midland, MI (US)

( * ) Notice: Subject to any disclaimer, the term of this patent is extended or adjusted under 35 U.S.C. 154(b) by 256 days.

(21) Appl. No.: 10/492,224

(22) PCT Filed: Oct. 10, 2002

(86) PCT No.: PCT/US02/32500

§ 371 (c)(1),
(2), (4) Date: Apr. 8, 2004

(87) PCT Pub. No.: WO03/031424

PCT Pub. Date: Apr. 17, 2003

(65) Prior Publication Data

US 2005/0256277 A1  Nov. 17, 2005

Related U.S. Application Data

(60) Provisional application No. 60/328,839, filed on Oct. 12, 2001.

(51) Int. Cl.
*C08L 63/02* (2006.01)
*C08L 77/06* (2006.01)

(52) U.S. Cl. ............. 525/421; 525/423; 525/425; 525/429; 525/432

(58) Field of Classification Search ............ None
See application file for complete search history.

(56) References Cited

U.S. PATENT DOCUMENTS

| | | | |
|---|---|---|---|
| 3,042,692 A | 7/1962 | Findley et al. | 260/404.5 |
| 3,235,568 A | 2/1966 | Findley et al. | 260/34 |
| 3,873,457 A | 3/1975 | Magne et al. | 252/47.5 |
| 3,931,058 A * | 1/1976 | Batzer et al. | 528/361 |
| 4,199,460 A | 4/1980 | Sumrell et al. | 252/46.7 |
| 4,520,175 A * | 5/1985 | Arai et al. | 525/438 |
| 6,153,771 A | 11/2000 | Lane et al. | 549/552 |

FOREIGN PATENT DOCUMENTS

| | | | |
|---|---|---|---|
| DE | 2147899 A | * | 1/1974 |
| DE | 2437318 A | * | 2/1976 |
| DE | 4218837 A1 | * | 12/1993 |
| EP | 0 094 436 | | 11/1983 |
| EP | 0 155 810 | | 9/1985 |
| EP | 0 747 371 | | 12/1996 |
| EP | 0 919 868 | | 6/1999 |
| GB | 1119030 A | * | 3/1970 |
| JP | 62-85244 A | * | 4/1987 |
| JP | 5-59031 A | * | 3/1993 |
| JP | 9-50099 A | * | 2/1997 |
| JP | 9-222707 A | * | 8/1997 |
| SU | 1413113 A | * | 7/1988 |
| WO | WO 02/055011 | | 7/2002 |

OTHER PUBLICATIONS

Hackh's Chemical Dictionary, Fourth Edition, McGraw-Hill Book Company, New York, New York, 1969, p. 27.*
XP-002225696; 6001 Chemical Abstracts, Columbus, OH, vol. 64 Apr. 11, 1966, No. 8, pp. 11356.
XP-002225697; 6001 Chemical Abstracts, Columbus OH, vol. 57 Aug. 20, 1982, No. 4.
XP-002225694; 6001 Chemical Abstracts, Columbus, OH, vol. 90 May 28, 1979, No. 22.
XP-002225693; 6001 Chemical Abstracts, Columbus, OH, vol. 12 Jun. 15, 1998, No. 24.

* cited by examiner

Primary Examiner—Robert Sellers

(57) ABSTRACT

The present invention provides compounds that have an amide linkage and at least two epoxy groups. The compounds are preferably aliphatic.

8 Claims, No Drawings

POLYEPOXY COMPOUNDS HAVING AN AMIDE LINKAGE

CROSS-REFERENCE TO RELATED APPLICATION

This application is a U.S. National Phase of copending PCT Application Ser. No. PCT/US02/32500 filed Oct. 10, 2002, which claims priority from U.S. application Ser. No. 60/328,839, filed Oct. 12, 2001, now expired.

FIELD OF INVENTION

The present invention relates to compounds containing at least two epoxy groups and at least one amide linkage. The invention further relates to compositions containing these compounds and to network polymers obtained by curing the compositions.

BACKGROUND OF THE INVENTION

Epoxy compounds are widely used, for instance in heat and/or radiation curable compositions. Despite the widespread use of conventional epoxy compounds, there is still an ongoing demand to provide epoxy compounds with improved characteristics.

SUMMARY

The present invention provides:
Compounds containing
(i) at least one amide linkage, preferably at least two amide linkages; and
(ii) at least two epoxy groups, preferably at least two terminal epoxy groups.

Compounds containing at least one amide linkage and at least two epoxy groups are hereinafter also referred to as polyepoxy amides. Preferred polyepoxy amides include those represented by the following formulae (1) to (6):

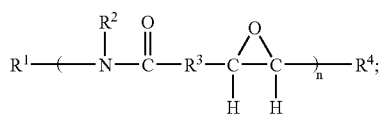
(1)

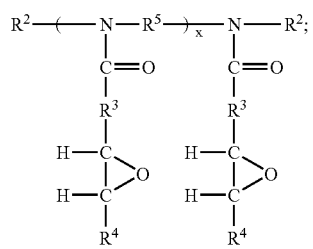
(2)

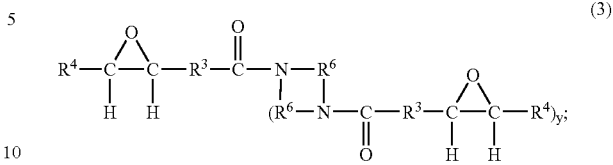
(3)

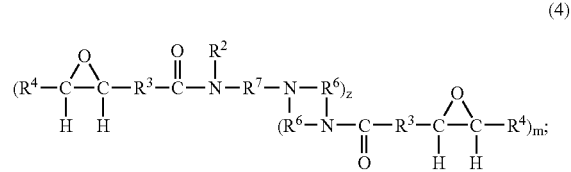
(4)

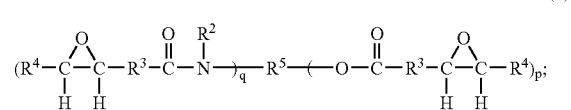
(5)

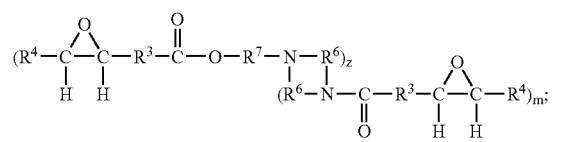
(6)

wherein:
n represents an integer of at least 2;
x represents an integer of at least 1, preferably at least 2;
y, z, m, p, and q represent integers of at least 1;
$R^3$, $R^5$, $R^6$, and $R^7$ independently represent a homo- or hetero-hydrocarbylene or -hydrocarbylidene group, preferably a homo-alkylene group; and
$R^1$, $R^2$, and $R^4$ independently represent hydrogen or a homo- or hetero-hydrocarbyl group, preferably hydrogen or a homo-alkyl group.

The present invention further provides compositions, and network polymers obtained by curing these compositions, wherein the compositions contain at least one polyepoxy amide. It is preferred that compositions according to the present invention further contain a curing agent.

Polyepoxy amides represented by any one of the following formulae (9), (11), or (12):

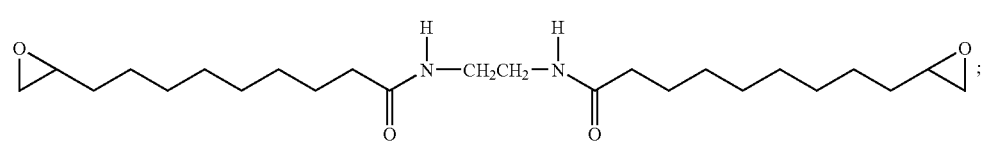
(9)

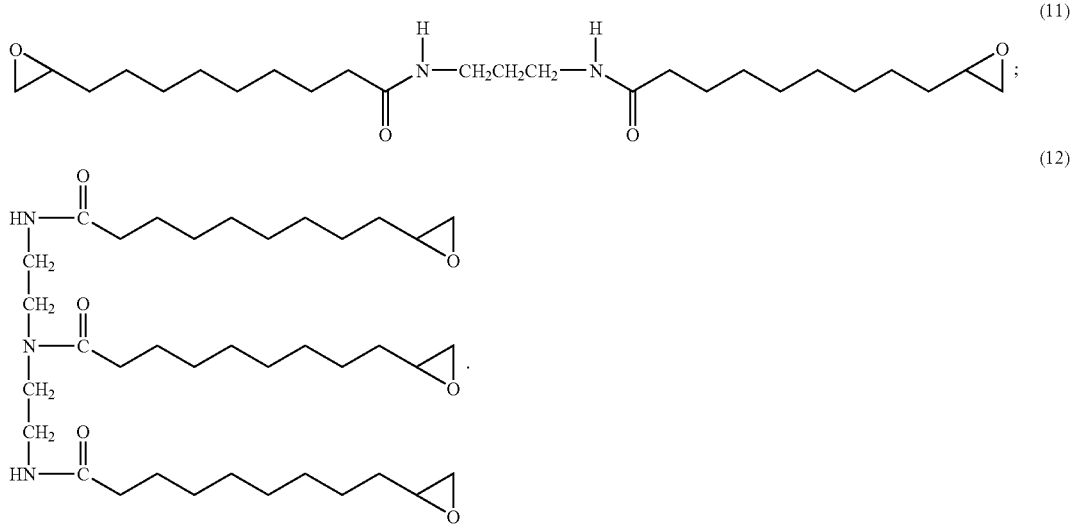

Compositions containing at least one polyepoxy amide.

Compositions containing at least one polyepoxy amide, a curing agent; and, optionally, a further reactive component; and compositions containing at least one polyepoxy amide, a curing agent, and, optionally, a polymerization catalyst(s).

Such compositions further containing at least one additive(s), or at least one solvent(s), or both.

Materials for coatings, for composites, and/or for other applications, that are or contain said composition(s).

Network polymers formed from the compositions.

Materials containing the network polymers. Coatings, composites, resin castings, films, adhesives and other materials containing the network polymers.

DETAILED DESCRIPTION OF THE INVENTION

Definitions

A homoalkyl group refers to an alkyl group consisting essentially of carbon and hydrogen atoms. A heteroalkyl group refers to an alkyl group which further contains other atoms, which may be present either in the main chain or, preferably, as substituents. Such other atoms include, for instance, oxygen, nitrogen, sulfur, and halogen atoms. Preferably at least 40 weight percent (wt %) of the heteroalkyl group is comprised of carbon and hydrogen atoms, more preferably at least 60 wt %, even more preferably at least 80 wt %, and most preferably at least 90 wt %. Both the homoalkyl and heteroalkyl groups may include cyclic structures. Preferred substituents for homoalkyl groups include methyl, ethyl, and propyl groups. Preferred substituents for heteroalkyl groups further include hydroxyl, nitro, cyano, and halogen groups.

A homo-hydrocarbyl group refers to a hydrocarbon group that is a monovalent radical; homo-hydrocarbylene and homo-hydrocarbylidene groups refer to hydrocarbon groups that are divalent radicals. These groups may include cyclic structures and/or unsaturated bonds, and thus may include aromatic structures (for example, aryl groups, arylene groups). Hetero-hydrocarbyl, hetero-hydrocarbylene, and hetero-hydrocarbylidene groups refer, respectively, to homo-hydrocarbyl, homo-hydrocarbylene, homo-hydrocarbylidene groups which further contain other atoms which may be present either in the main chain or, preferably, as substituents. Such other atoms include, for instance, oxygen, nitrogen, sulfur, and halogen atoms. Preferably at least 40 wt % of the hetero-hydrocarbon group is comprised of carbon and hydrogen atoms, more preferably at least 60 wt %, even more preferably at least 80 wt %, and most preferably at least 90 wt %. Preferably the homo- and hetero-hydrocarbon groups are saturated. Preferred substituents for homo-hydrocarbon groups include methyl, ethyl, and propyl groups. Preferred substituents for hetero-hydrocarbon groups further include hydroxyl, nitro, cyano, and halogen groups.

In a preferred embodiment, a hydrocarbon group or radical will contain less than 100 main chain atoms, more preferably less then 80, even more preferably less than 50, still more preferably less than 30, yet more preferably less than 25, and even still more preferably less than 20 main chain atoms. A hydrocarbon group or radical will contain at least 1 main chain atom. In a preferred embodiment, a hydrocarbon group or radical will contain at least 2 main chain atoms, more preferably at least 3, even more preferably at least 4, still more preferably at least 5, yet more preferably at least 6, and even still more preferably at least 7 main chain atoms. In a preferred embodiment, a hydrocarbon group or radical will contain 5 main chain atoms; in a preferred embodiment, a hydrocarbon group or radical will contain 8 main chain atoms; in a preferred embodiment, a hydrocarbon group or radical will contain 11 main chain atoms; in a preferred embodiment, a hydrocarbon group or radical will contain 14 main chain atoms. In a particularly preferred embodiment, a hydrocarbon group or radical will contain 8 main chain atoms. In a preferred embodiment, all main chain atoms will be carbon atoms. Hydrocarbon groups and radicals include, for example, alkyl, alkylidene, alkenyl, alkenylene, aryl, arylene, alkylaryl, aliphatic, and cycloaliphatic groups and radicals.

Polyepoxy Amides

A polyepoxy amide according to the present invention, is a compound containing:

(i) at least one amide linkage, preferably at least two amide linkages; and (ii) at least two epoxy groups, preferably at least two terminal epoxy groups.

Compounds containing at least one amide linkage and at least two epoxy groups are hereinafter also referred to as polyepoxy amides. Preferred polyepoxy amides include those represented by the following formulae (1) to (6):

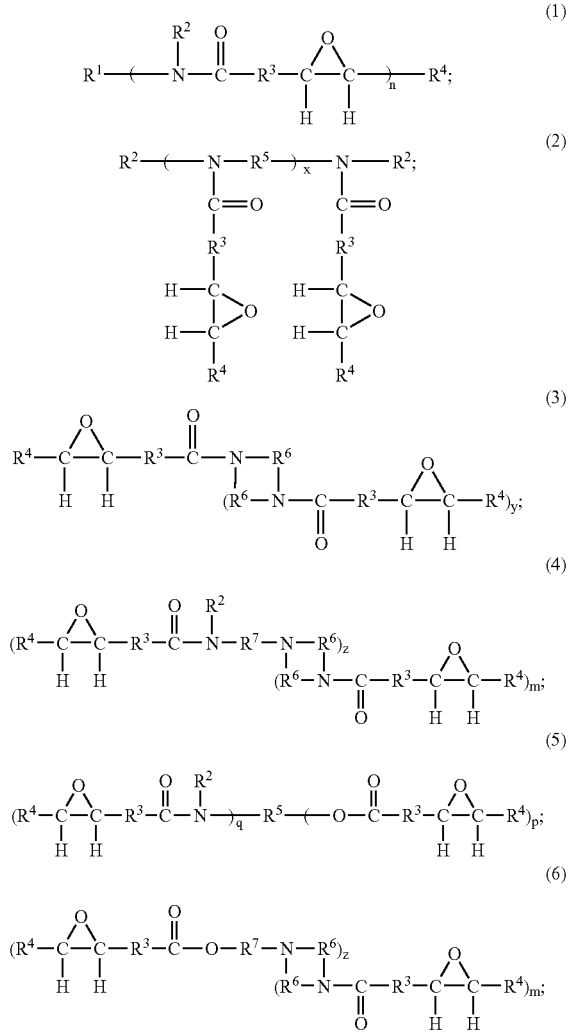

wherein:
n represents an integer of at least 2;
x represents an integer of at least 1, preferably at least 2;
y, z, m, p, and q represent integers of at least 1;
$R^3$, $R^5$, $R^6$, and $R^7$ independently represent a homo- or hetero-hydrocarbylene or -hydrocarbylidene group, preferably a homo-alkylene group; and
$R^1$, $R^2$, and $R^4$ independently represent hydrogen or a homo- or hetero-hydrocarbyl group, preferably hydrogen or a homo-alkyl group.

The epoxy compounds having at least one amide linkage may be formed by: (1) providing at least one carboxylic acid containing at least one unsaturation, preferably a terminal unsaturation (an omega-unsaturation); (2) providing at least one amino-organic compound that is a monoamino-, diamino-, triamino-, or polyamino-organic compound, preferably an at least diamino-organic compound; (3) reacting said amino compound(s) with the carboxylic acid(s) to form at least one amide containing both at least one amide linkage and at least two unsaturations; and (4) then epoxidating at least two unsaturations present in the amide to form an epoxy compound having at least one amide linkage. However, where a monoamino-organic compound is used, the monoamino-organic compound will itself contain at least one unsaturation that can be epoxidated under the reaction conditions used to epoxidate an unsaturation present in the portion(s) of the amide that was contributed by the carboxylic acid(s). Amidation and epoxidation reactions are well known in the art and are useful, respectively, for the purposes of forming and then epoxidating the amides hereof.

In a preferred embodiment, the carboxylic acid containing at least one unsaturation will contain at least 3 main chain atoms, more preferably at least 4, even more preferably at least 5, still more preferably at least 6, yet more preferably at least 7, and even still more preferably at least 8 main chain atoms. In a preferred embodiment, the carboxylic acid containing at least one unsaturation will contain less than 100 main chain atoms, more preferably less then 80, even more preferably less than 50, still more preferably less than 30, yet more preferably less than 25, and even still more preferably less than 20 main chain atoms. Preferably, the carboxylic acid containing at least one unsaturation will contain 4, 5, 6, 8, 10, 11, 12, 14, 16, 17, 18, 20, 22, 24, 26, 28, or 30 main chain atoms; more preferably 8, 10, 11, 12, 14, 16, 17, or 18 main chain atoms. Even more preferably, the carboxylic acid containing at least one unsaturation will contain 8, 11, 14, or 17 main chain atoms. In a particularly preferred embodiment, the carboxylic acid containing at least one unsaturation will contain 11 main chain atoms. In a preferred embodiment, all main chain atoms will be carbon atoms. In a preferred embodiment, the carboxylic acid will be a mono-carboxylic acid. In a preferred embodiment, the carboxylic will be a mono-unsaturated carboxylic acid.

In preferred embodiment, the carboxylic acid will be at least one of propenoic, 3-butenoic, 4-pentenoic, 5-hexenoic, 6-heptenoic, 7-octenoic, 8-nonenoic, 9-decenoic, 10-undecenoic, 11-dodecenoic, 12-tridecenoic, 13-tetradecenoic, 14-pentadecenoic, 15-hexadecenoic, 16-heptadecenoic, 17-octadecenoic, 18-nonadecenoic, 20-heneicosenoic, 22-tricosenoic, 24-pentacosenoic, or 26-heptacosenoic acid. More preferably, the carboxylic acid will be at least one of 5-hexenoic, 6-heptenoic, 7-octenoic, 10-undecenoic, 12-tridecenoic, 14-pentadecenoic, 16-heptadecenoic, 18-nonadecenoic, 20-heneicosenoic, or 22-tricosenoic acid. Even more preferably, the carboxylic acid will be at least one of 10-undecenoic, 12-tridecenoic, 14-pentadecenoic, or 16-heptadecenoic acid. In a particularly preferred embodiment, the carboxylic acid will be 10-undecenoic acid. The carboxylic acid containing at least one unsaturation will preferably be, or be derived from, a biologically-produced unsaturated fatty acid, for example, oleic acid. The carboxylic acid containing at least one unsaturation can be derived from a biologically-produced unsaturated fatty acid by, for example, a metathesis reaction such as is commonly known in the art. Carboxylic acids containing at least one unsaturation are widely commercially available.

In a preferred embodiment, the amino-organic compound will be an amine that is an aryl amine, alkylaryl amine, aliphatic amine, or cycloaliphatic amine. In a preferred embodiment, the amine will be a diamine, triamine, or higher amine. In a preferred embodiment, the amine will contain at least one primary amino group; more preferably at least two primary amino groups. In a preferred embodiment, the amine will contain at least one secondary amino group. The amine may contain both primary amino group(s) and secondary amino group(s). Where the amine contains more than one secondary amino group, preferably the secondary amino groups will be separated from each other approximately equidistantly along the main chain of the amine. In a preferred embodiment, the amine will contain at least 2 amino groups. In a preferred embodiment, the amine will contain up to about 10 amino groups; more preferably up to about 8, even more preferably up to 6, and still more preferably up to 5 amino groups. In a preferred embodiment, the amine will contain 3 amino groups. In a preferred embodiment, the amine will contain 2 amino groups. In a preferred embodiment, the amine will contain at least 3 main chain atoms, more preferably at least 4 main chain atoms. In a preferred embodiment, the amine will contain up to about 30 main chain atoms, more preferably up to about 20 main chain atoms, even more preferably up to about 15 main chain atoms, and still more preferably up to about 10 main chain atoms.

Illustrative examples of preferred diamines include, but are not limited to: ethylene diamine; 1,2-diaminopropane; 1,3-diaminopropane; N,N'-dialkyl-1,3-propanediamine; 1,4-butanediamine; 1,6-hexanediamine, and phenylene-diamine. Illustrative examples of preferred triamines include, but are not limited to: diethylene-triamine; ethylene-trimethylene-triamine; bis(trimethylene)triamine; and melamine. Illustrative examples of preferred higher amines include, but are not limited to: triethylene-tetramine; tris(trimethylene)tetramine; tetraethylene-pentamine; and pentaethylene-hexamine. Particularly preferred amines include ethylene diamine, 1,3-diaminopropane, diethylene-triamine, and triethylene-tetramine. Amines may be prepared by any of the many methods well known in the art; amines are widely commercially available.

The reacting of the carboxylic acid with the amine to form the amide may be accomplished by any of the methods known in the art. For example, the carboxylic acid may, and preferably will, first be converted to an acid halide, preferably an acid chloride. Among the methods known for this purpose is treatment of the acid, or a carboxylate salt made therefrom, with, for example: sulfonyl chloride, oxalyl chloride, phosphorus oxychloride, phosphorus trichloride, phosphorus pentachloride, or phosgene (carbonyl chloride); or with a corresponding bromide; or with cyanuric fluoride. Carboxylic acid halides are also commercially available. The acid halide may then be contacted with the amine, in an organic solvent, to form the amide. Preferably, the organic solvent is a moderately polar organic solvent, for example, tetrahydrofuran (THF), diethylether, chloroform, methylene chloride, pyridine, or dioxane.

Once formed, the amide may then be epoxidized by treatment with an active oxygen agent, in an organic solvent, to epoxidize unsaturations present therein. For example, a peroxy-carboxylic acid [RC(O)OOH] or salt thereof, such as peracetic acid, perpropionic acid, perbenzoic acid, bicarbonate-activated peroxide (percarbonate ion), sodium or potassium percarbonate, or magnesium monoperoxyphthalate, may be used as the active oxygen agent. Preferably, the organic solvent will be a moderately polar organic solvent, such as is described above. As a product of such an epoxidation reaction, an epoxy compound having at least one amide linkage is obtained.

The polyepoxy amides may be used in, or used to form, compositions. The compositions containing the polyepoxy amide(s) may be used to form network polymers obtained by curing these compositions. It is preferred that compositions according to the present invention further contain a curing agent. The compositions may contain a polymerization catalyst(s), a further reactive component(s), an additive(s), or a solvent(s). The compositions may be used in various applications, for example: as coatings, as materials for coatings, as matrix materials for composites, and other applications.

Curing Agent

Preferred curing agents include aliphatic amines, aromatic amines, isocyanates, polyfunctional hydroxyl containing compounds, anhydrides, polyfunctional acids, imidazoles, polyfunctional mercaptans, boron trihalide complexes, dicyanamides, and mixtures thereof.

Suitable aliphatic amine curing agents include, for instance, 1,2-diaminocyclohexane, isophorone diamine, ethylenediamine, diethylenetriamine, triethylenetetraamine, tertraethylenepentamine, ethanolamine, piperazine, aminoethylpiperazine, aminoethylethanolamine, diethylaminopropylamine, dimethylaminopropylamine, 2,5-dimethyl-2,5-hexanediamine, bis(aminocyclohexyl)methane, 3-amino-1-cyclohexylaminopropane, polyethanolamine, polypropanolamine, polyethyleneimine, and mixtures thereof.

Suitable aromatic amine curing agents include, for instance, diaminobenzene, methylenedianiline, oxydianiline, diaminodiphenylsulfide, diaminodiphenylsulfone, 2,4-bis -(p-aminobenzyl)aniline, diaminotoluene, ketimine, amidoamine, and mixtures thereof.

Suitable polyfunctional hydroxyl containing compounds include novolacs (thermoplastic phenol-formaldehyde resins obtained primarily by the use of acid catalysts and excess phenol), resoles (alkaline-catalyzed, thermosetting phenol-formaldehyde resins consisting primarily of partially condensed phenol alcohols), and bisphenols such as bisphenol A (4,4'-isopropylidenediphenol), bisphenol F [bis(4-hydroxyphenyl)methane] and 2,2'-bisphenol.

Suitable anhydrides include, for instance, benzophenone tetracarboxylic acid anhydride, chlorendic anhydride, succinic anhydride, dodecenylsuccinic anhydride, hexahydrophthalic anhydride, maleic anhydride, methyl hexahydrophthalic anhydride, tetrahydrophthalic anhydride, NADIC methyl anhydride (3$a$,4,7,7$a$-tetrahydromethyl-4,7-methanoisobenzofuran-1,3-dione), phthalic anhydride, polyadipic polyanhydride, polyazelaic polyanhydride, polysebasic polyanhydride, pyromellitic anhydride, and mixtures thereof.

Suitable polyfunctional acids include, for instance, adipic acid, sebasic acid, azelaic acid, terephthalic acid, isophthalic acid, cyclohexanedicarboxylic acid, and mixtures thereof.

Suitable imidazoles include, for instance, 2-methylimidazole, 2-hydroxypropylimidazole, 2-heptadecylimidazole, 1-benzyl-2-methylimidazole, 2-ethyl-4-methylimidazole, 1-cyanoethyl-2-ethyl-4-methylimidazole, 2-phenyl-4-methylimidazole, 2-phenyl-4,5-dihydroxymethylimidazole, and mixtures thereof.

Suitable boron trihalide complexes include, for instance, boron trifluoride diethyl etherate.

Iodonium salts (for example, diaryliodonium salts), and sulfonium salts (for example, triarylsulfonium salts) may also be used as curing agents. A preferred diaryliodonium salt is diaryliodonium hexafluoroantimonate. The compositions containing iodonium salts and sulfonium salts may also contain any suitable photosensitizer such as, for instance, anthracene, pyrene, perylene, and mixtures thereof.

The compositions may also contain a suitable polymerization accelerator. Suitable polymerization accelerators include, for instance, multifunctional acrylate monomers, phenolics, monofunctional acids, novolacs, and bisphenols.

Suitable phenolics include, for instance, 4-tert-butylphenol, catechol, 2-chlorophenol, 4-nitrophenol, 2,4-dimethylphenol and nonylphenol.

Suitable multifunctional acrylates include, for instance, tripropylene glycol diacrylate and trimethylolpropane triacrylate.

Suitable monofunctional acids include, for instance, salicylic acid, 5-chlorosalicylic acid, 2,4-dichlorobenzoic acid and valeric acid.

Suitable bisphenols include for instance, bisphenol A (4,4'-isopropylidenediphenol), bisphenol F [bis(4-hydroxyphenyl)methane] and 2,2'-bisphenol.

Polymerization Catalyst

The present compositions may contain a suitable polymerization catalyst. Examples of suitable polymerization catalysts include, for instance, tertiary amines, Lewis acids, onium salts, and imidazoles.

Suitable tertiary amines include, for instance, benzyldimethylamine, 2-dimethylaminomethylphenol, and 2,4,6-tris(dimethylaminomethyl)phenol.

Suitable Lewis acids include, for instance, stannous octoate and dibutyltin dilaurate.

Suitable onium salts which can be used as a catalyst include, for instance, ammonium salts (for example, tetrabutylammonium bromide).

Further Reactive Components

The present compositions may contain, besides one or more of the polyepoxy amides, any further suitable reactive components such as, for instance, other epoxy-functional components, hydroxy-functional components, acrylate-functional components, as well as mixtures thereof. For instance, the present compositions may contain the diglycidyl ether of bisphenol A. Preferred diglycidyl ethers of bisphenol A include those represented by the following formula (7):

Water and Organic Solvent

The compositions may contain water and/or organic solvents, for instance to facilitate spraying the present compositions on a substrate.

Curing and Properties

Curing of the present compositions may be initiated by any suitable means, for instance by heat and/or radiation, such as ultraviolet (UV) radiation or electromagnetic radiation. Because the present polyepoxy amides contain at least two epoxy groups, the present compositions can form a crosslinked network upon cure, which crosslinked network is also referred to as a "network polymer".

Thermoplastic Polymers

The present polyepoxy amides may also be used to form thermoplastic polymers. For instance, they may be polymerized with, e.g., dicarboxylic acids to form thermoplastic polyesters. An illustrative example of such a polymerization is given below:

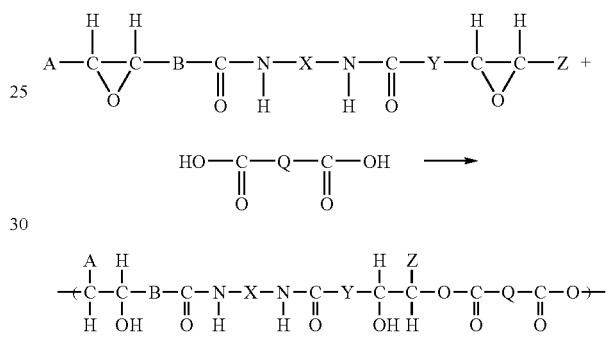

wherein:

A and Z independently represent hydrogen or a homo- or hetero-hydrocarbyl group, preferably hydrogen or a homo-alkyl group; and (7)

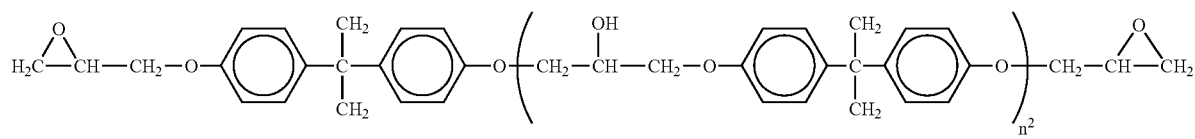

wherein $n^2$ represents an integer of 0 to 10.

Additives

The compositions of the present invention may contain any suitable additives. For instance, pigments may be added to color the compositions. Other suitable additives which may be added include, for instance, stabilizers (for example, antioxidants), rheology control agents, flame retardants, light stabilizers, flow modifiers, color stabilizers, inert fillers, and combinations thereof. Inert fillers can be inorganic (for example, glass beads, talc, silica particles, or clays) or organic (for example, polysaccharides, modified polysaccharides, and naturally occurring particulate fillers) or both.

B, X, Y, and Q independently represent a homo- or hetero-hydrocarbylene or hetero-hydrocarbylidene group, preferably a homo-alkylene group.

Applications

The polyepoxy amides may be used in a wide variety of applications. For instance, they can be used to obtain coatings, matrix materials for composites (for example, for composites that are reinforced with fibers such as glass fibers, polyamide fibers, polyester fibers, carbon fibers, or naturally occurring fibers such as wood, jute, ramie, flax, bamboo, or sisal fibers, or combinations thereof), adhesives, and molded parts. For instance, compositions containing the present polyepoxy amides may be used to coat substrates, for instance wood, metal, or plastic substrates. The compositions may be applied as a solid or as a liquid. Preferably the compositions are applied as a liquid and by spraying the compositions onto the substrate.

EXAMPLES

The following examples are given as particular embodiments of the invention and to demonstrate the practice and advantages thereof. It is to be understood that the examples are given by way of illustration and are not intended to limit the specification or the claims that follow in any manner.

Synthesis of N,N'-ethylenebis(10-undecenamide)

To a 500 mL, three-necked round bottom flask (fitted with a reflux condenser, addition funnel, and stir bar) was added 10-undecenoyl chloride (32.2 mL, 30.4 g, 0.150 mol) and tetrahydrofuran (THF) (200 mL). To the addition funnel was added ethylenediamine (4.51 g, 0.075 mol), triethylamine (42 mL, 30.5 g, 0.300 mol), and THF (75 mL). The amine solution was added dropwise to the acid chloride solution over one hour, yielding a white precipitate. On completion of addition, the reaction mixture was stirred at 25° C. for one hour. The reaction mixture was then filtered to remove precipitated solids. The precipitated solids were added to water (250 mL) and stirred. The insoluble solid was collected via filtration, then air dried. The crude product was recrystallized from a mixture of acetone (500 mL) and water (20 mL) to produce a white solid which was dried in vacuo (that is, under vacuum) at 25° C. for 6 hours. The thus obtained compound is represented by formula (8) shown below. Yield: 10 g (34%). Melting point (M.P.): 146-148° C. $^1$H and $^{13}$C NMR analyses were consistent with the structure of formula (8).

Synthesis of epoxidized N,N'-ethylenebis(10-undecenamide)

To a 500 mL, three-necked round bottom flask (fitted with a reflux condenser, addition funnel, and stir bar) was added undecenamide according to the above formula (8) (8.90 g, 22.7 mmol, 45.3 mmol double bonds), sodium acetate (0.63 g), and methylene chloride (170 mL). To the addition funnel was added 32 wt % peracetic acid (19.1 mL of 32 wt %, 21.6 g of 32 wt %, 6.91 g of peracetic acid, and 90.9 mmol of peracetic acid). The peracetic acid solution was added dropwise over 20 minutes to the suspension of formula (8) in methylene chloride, which had been cooled to 15° C. The reaction mixture was stirred at 25° C. for one hour, during which time the amide dissolved/reacted. The reaction mixture was then heated at reflux for 16 hours. The reaction mixture was then cooled to 15° C. in an ice bath, after which a solution of 60% (w/v) sodium bisulfite (9.44 g, 90.8 mmol) in water (200 mL) was added dropwise to the reaction mixture. A white solid/gel precipitated from solution. The solid was collected via suction filtration. The aqueous and organic phases were discarded. The crude product was recrystallized from a 2:1 mixture of acetone/ethanol (400 mL), then dried in vacuo at 25° C. for 16 hours. The thus obtained polyepoxy amide is represented by formula (9) shown below. Yield: 5.93 g (61%). Epoxide equivalent weight (EEW): 218.8 g/mol epoxide (calculated EEW=212.3).

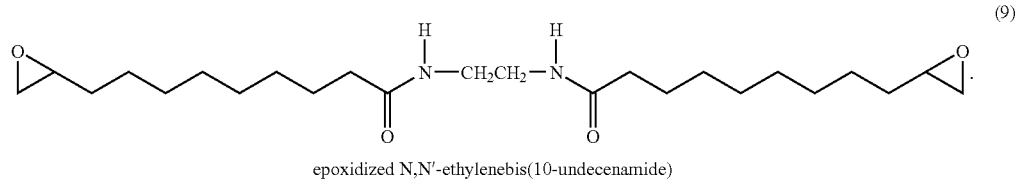

epoxidized N,N'-ethylenebis(10-undecenamide) (9)

Synthesis of N,N'-(1,3-propylene)bis(10-undecenamide)

To a 500 mL, three-necked round bottom flask (fitted with a reflux condenser, addition funnel, and stir bar) was added 10-undecenoyl chloride (32.2 mL, 30.4 g, 0.150 mol) and THF (200 mL). To the addition funnel was added 1,3-diaminopropane (5.56 g, 0.075 mol), triethylamine (42 mL, 30.5 g, 0.300 mol), and THF (75 mL). The amine solution was added dropwise to the acid chloride solution over one hour, yielding a white precipitate. On completion of addition, the reaction mixture was stirred at 25° C. for one hour. The reaction mixture was filtered to remove precipitated solids. The precipitated solids were added to water (250 mL) and stirred. The insoluble solid was collected via filtration,

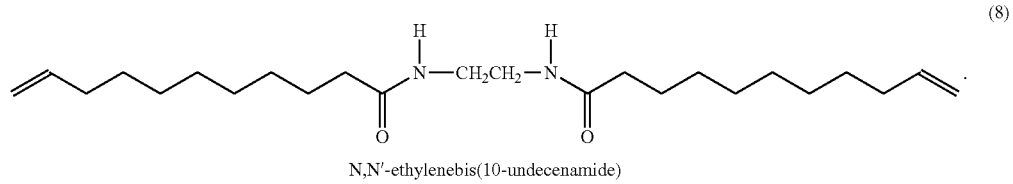

N,N'-ethylenebis(10-undecenamide) (8)

then air dried. The crude product was recrystallized from hot toluene (250 mL) to produce a white solid which was dried in vacuo at 25° C. for 16 hours. The thus obtained compound is represented by formula (10) shown below. Yield: 9.6 g (31%). M.P.: 117° C. to 119° C. $^1$H and $^{13}$C NMR analyses were consistent with the structure of formula (10).

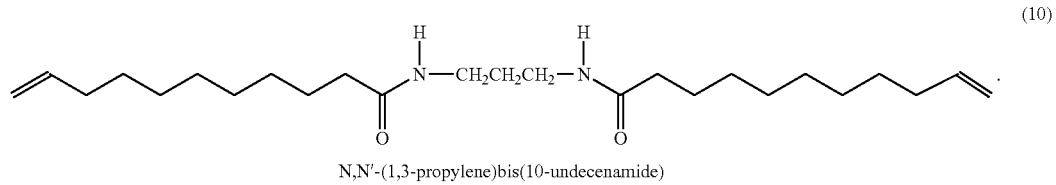

N,N'-(1,3-propylene)bis(10-undecenamide)

Synthesis of epoxidized N,N'-(1,3-propylene)bis(10-undecenamide)

To a 100 mL, three-necked round bottom flask (fitted with a reflux condenser, addition funnel, and stir bar) was added undecenamide according to the above formula (10) (4.07 g, 10.0 mmol, 20.0 mmol double bonds) and methylene chloride (50 mL). To the addition funnel was added a solution of sodium acetate (0.17 g) in 32 wt % peracetic acid (5.05 mL of 32 wt %, 5.71 g of 32 wt %, 1.83 g peracetic acid, and 24.0 mmol peracetic acid). The peracetic acid solution was added dropwise over 20 minutes to the suspension of formula (10) in methylene chloride, which had been cooled to 15° C. The reaction mixture was stirred at 25° C. for one hour, during which time the amide dissolved/reacted. The reaction mixture was then heated at reflux for 15 hours. The reaction mixture was then cooled to 15° C. in an ice bath, after which a solution of sodium sulfite (3.02 g, 24.0 mmol) in water (30 mL) was added dropwise to the reaction mixture. The organic and aqueous layers were then separated. The organic solution was washed consecutively with equal volumes of water, 5% (w/v) NaCl (twice), and 5% (w/v) NaHCO$_3$ (twice). The organic layer was then dried over MgSO$_4$, filtered, and solvent was removed under reduced pressure to yield a white solid. The crude product was recrystallized from acetone (100 mL) to which water (1 mL) had been added. The recrystallized product was dried in vacuo at 25° C. for 4 hours. The thus obtained polyepoxy amide is represented by formula (11) shown below. Yield: 1.65 g (38%). M.P. 119-122° C. Epoxide equivalent weight (EEW): 224.6 g/mol epoxide (calculated EEW=219.3).

The organic and aqueous phases were allowed to separate and the organic phase was washed repeatedly with water until a pH 6 was reached. The washed organic phase was dried over anhydrous sodium sulfate overnight and then the chloroform was stripped off in vacuo to yield 20.5 g of crude product. The thus obtained polyepoxy amide is represented by formula (12) shown below. Recrystallization of the crude product from warm hexane yielded 10.75 g, of diethylenetriamine-N,N',N"-tri(10,11-epoxyundecamide) with an epoxide value of 18.8 wt % (94.7% of theory).

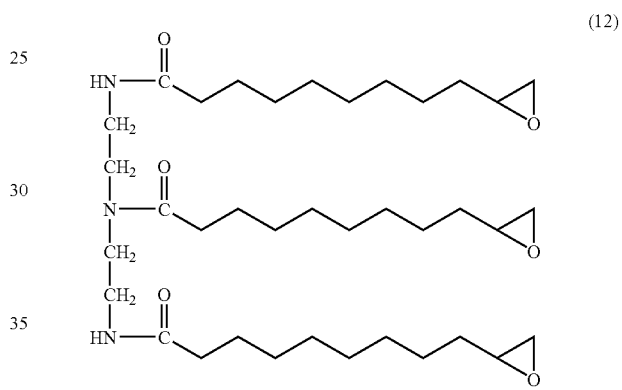

diethylenetriamine-N,N',N"-tri(10, 11-epoxyundecamide)

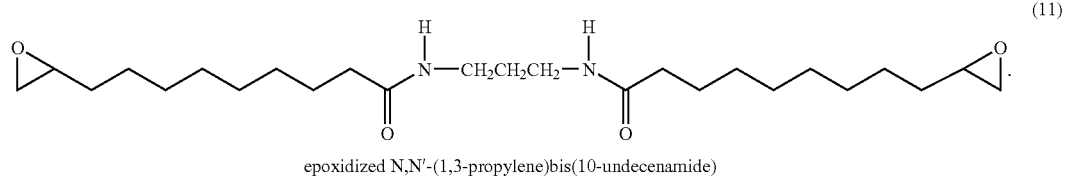

epoxidized N,N'-(1,3-propylene)bis(10-undecenamide)

Synthesis of diethylenetriamine-N,N',N"-tri(10,11-epoxyundecamide)

Diethylenetriamine-N,N',N"-tri(10,11-undecenamide), 20 g (0.031 moles), and 352.9 g of chloroform were charged to a 500 mL reaction vessel and cooled to 13° C. 26.3 g of 32 wt % peracetic acid (0.11 moles) in acetic acid (containing 0.78 g, 0.01 moles of sodium acetate) was added with stirring while maintaining the temperature below 15° C. After addition of the peracetic acid addition, the temperature was raised to 40° C. and maintained for 7 hours before cooling to ambient temperature where stirring was continued for an additional 16 hours. The reaction mixture was again cooled to below 15° C. and the excess peracid was neutralized by dropwise addition of 104.6 g of 10% (w/v) aqueous sodium sulfite while maintaining a temperature below 15° C.

Preparation of a cured resin composition containing diethylenetriamine-N,N',N"-tri(10,11-epoxyundecamide)

1.5060 g of diethylenetriamine-N,N',N"-tri (10,11-epoxyundecamide) and an equivalent amount of 4,4'-methylenedianiline (0.2996 g) were combined and placed into a 120° C. oven for 7 minutes to dissolve the 4,4'-methylenedianiline. After the 4,4'-methylenedianiline was dissolved, the resinous mixture was poured into a small aluminum pan. To the 1.3393 g of the resinous mixture in the aluminum pan, 0.033 g of starnnous octoate was added. This mixture was then placed back into the oven where it was cured according to the following schedule: 2 hours at 120° C., 2.5 hours at 140° C., and 2.5 hours at 180° C. Upon cooling to room temperature, a casting of the material was obtained from the aluminum pan. Differential scanning calorimetry analysis for this casting was conducted at a heating rate of 10° C. per minute from 25° C. to 250° C. This analysis showed a glass transition temperature of 84° C.

The above description illustrates specific embodiments of the present invention; it will be understood that many modifications thereof will readily be apparent to those skilled in the art, and it is intended therefore that this invention be limited only by the spirit and scope of the following claims.

The invention claimed is:

1. A network polymer formed by curing a composition containing:
   (i) a polyepoxy amide represented by any one of the following formulae (2), (3), (4), (5), or (6):

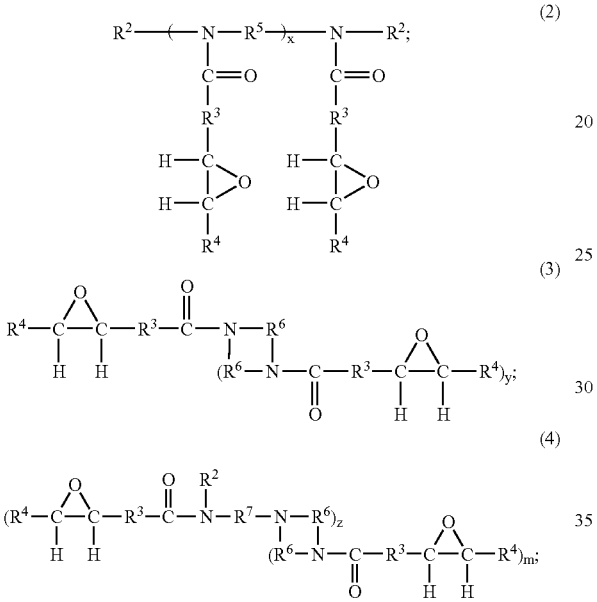

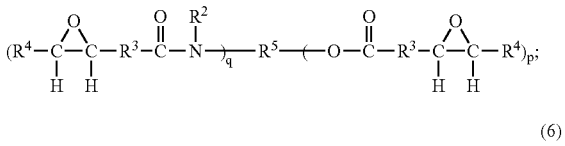

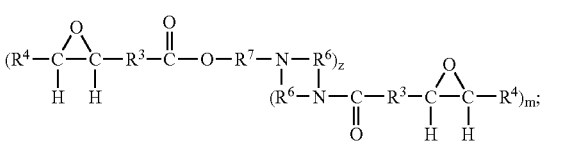

wherein:

n represents an integer of at least 2;

x represents an integer of at least 1;

y, z, m, p, and q represent integers of at least 1;

$R^2$ independently represents hydrogen or a homo- or hetero-hydrocarbyl group;

$R^3$ independently represents an alkylene group, and $R^3$ independently contains 8 to less than 30 main chain atoms;

$R^4$ represents hydrogen;

$R^5$ independently represents a homo-hydrocarbylene or -hydrocarbylidene group;

$R^6$ and $R^7$ independently represent a homo- or hetero-hydrocarbylene or -hydrocarbylidene group.

2. The network polymer of claim 1, wherein said polyepoxy amide is represented by any one of formula (5) or formula (6).

3. The network polymer of claim 1, wherein said polyepoxy amide is represented by any one of the following formulae (9), (11), or (12):

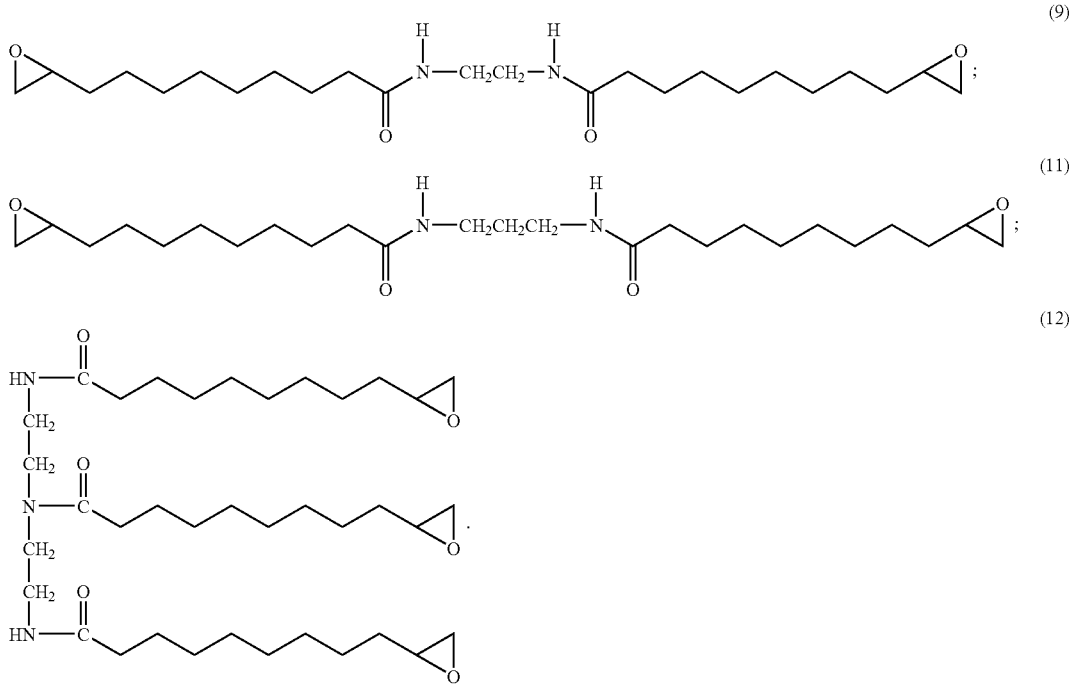

4. The network polymer of claim 1 further comprising a further reactive component.

5. The network polymer of claim 4, wherein said further reactive component is an epoxy resin that is not a polyepoxy amide.

6. The network polymer of claim 4, wherein said further reactive component is a diglycidyl ether of bisphenol A.

7. The network polymer of claim 1, wherein said composition further contains an additive that is an antioxidant, a flame retardant, a pigment, a flow modifier, a color stabilizer, an inert filler, or a combination thereof.

8. A resin casting, a film, an adhesive layer, or a bonding agent, containing the network polymer of claim 1.

* * * * *

UNITED STATES PATENT AND TRADEMARK OFFICE
CERTIFICATE OF CORRECTION

PATENT NO. : 7,300,986 B2  Page 1 of 1
APPLICATION NO. : 10/492224
DATED : November 27, 2007
INVENTOR(S) : David J. Brennan et al.

It is certified that error appears in the above-identified patent and that said Letters Patent is hereby corrected as shown below:

On the Title Page, item (75), third line, please delete "Mary L. Dettloff" and insert instead -- Marvin L. Dettloff --.

item (73), first line, please delete "Dow3Global" and insert instead -- Dow Global --.

Signed and Sealed this

Sixteenth Day of December, 2008

JON W. DUDAS
*Director of the United States Patent and Trademark Office*